June 13, 1944.  W. L. CHILDS ET AL  2,351,320

ROCK BIT

Filed Oct. 12, 1939  2 Sheets-Sheet 1

William L. Childs
John F. Shaw
Wiley B. Noble
Inventors

By J. Vincent Martin
and
Ralph R. Browning
Attorneys

June 13, 1944.  W. L. CHILDS ET AL  2,351,320

ROCK BIT

Filed Oct. 12, 1939  2 Sheets-Sheet 2

William L. Childs
John F. Shaw
Wiley B. Noble
Inventors

By J. Vincent Martin
and
Ralph R. Browning
Attorneys

Patented June 13, 1944

2,351,320

UNITED STATES PATENT OFFICE 2,351,320

ROCK BIT

William L. Childs, Houston, Tex., John F. Shaw, Los Angeles, Calif., and Wiley B. Noble, Houston, Tex., assignors to Reed Roller Bit Company, Houston, Tex., a corporation of Texas Application October 12, 1939, Serial No. 299,090

7 Claims. (Cl. 255—71)

This invention relates to rock bits, and more particularly to those in which the cutter assembly includes so-called cross roller cutters mounted by roller bearings and ball bearings on a transverse shaft at the forward end of the bit.

In a device of this kind, where two rotary cutters are mounted on a single shaft between two legs depending from the bit head, numerous mechanical problems arise in regard to the structure of the shaft, roller bearing races, ball bearing races, cutters, etc., and the method of assembling the same. This is due to the fact that it is desirable to have a rigid, one-piece shaft to provide strength and the cutters should enclose and seal the bearings as far as possible, not only for their most efficient operation but also to prevent sand, grit, etc., from entering the bearings. Further, the ball bearing races must be smooth and uninterrupted to provide the minimum of friction and, for best results, means must be provided for inserting the balls therein without destroying the rigidity of the shaft or the surface of the cutters. We are aware that various developments have been made in ball bearing roller bits, but, so far as we are aware, no one has developed a bearing assembly which solves the above problems in the manner of that embodied in our invention.

The primary object of our invention is to decrease the friction and increase the rigidity of the mountings for cross roller cutters.

Another object is to provide an uninterrupted ball race in a cutter mounting into which the balls may be inserted without impairing either the cutter or its shaft.

Another object is to provide a structure of the type referred to which may be readily assembled to form a durable and efficient bit.

Further objects and features may become evident from the following disclosure, when taken in connection with the accompanying drawings, in which.

Figure 1:
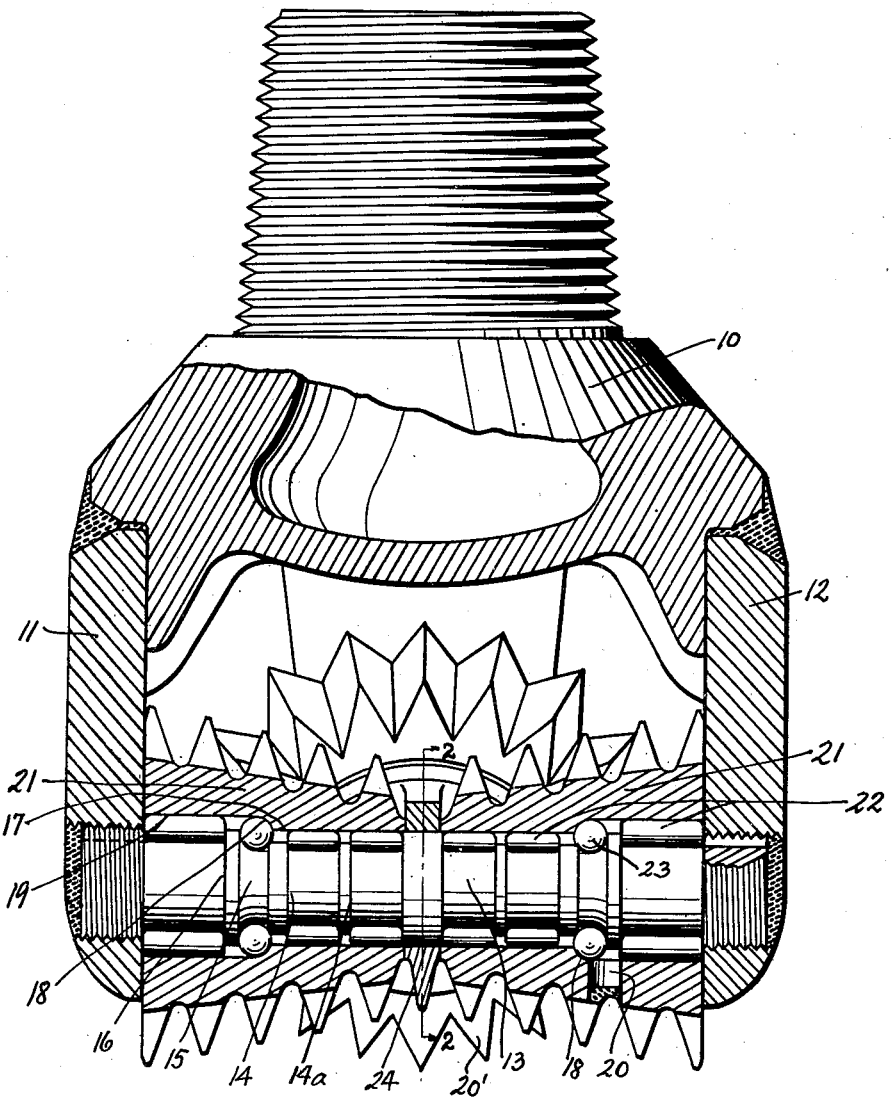
Fig. 1 is a lonigtudinal cross section of a drill bit embodying my invention.

Referring to the drawings in detail, a bit body 10 has depending therefrom and welded thereto the legs 11, 12 carrying screw-threaded between them the shaft 13. Shaft 13 is formed with races for roller bearings and thrust ball bearings. In the form shown in Fig. 1, there are two smaller roller bearing races 14 and 14a, a thrust bearing race 15, and a larger roller bearing race 16, on each side. In that shown in Fig. 3 there are smaller roller races 14, thrust ball bearing races 15, and larger roller bearing races 16 on each side.

In either form, the general structure of the cutter rollers is the same. This consists of a smaller bore 17, a thrust bearing race 18, and a larger bore 19. This inside configuration applies to all of the roller cutters. There is, however, in one of the rollers of each pair, an aperture 20, of a size of receive a ball bearing and spaced adjacent the ball race 18.

Figure 3:
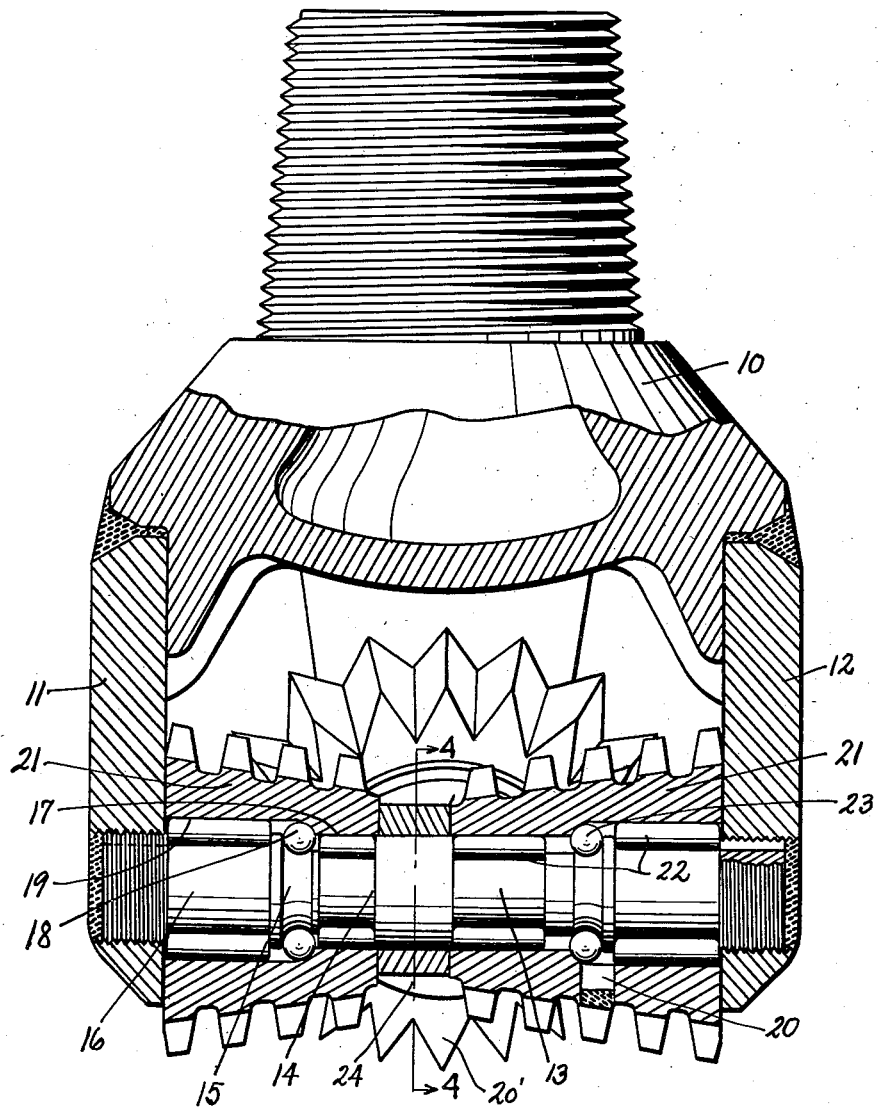
Fig. 3 is a longitudinal cross-section of a slightly different drill bit embodying my invention.
Figure 4:
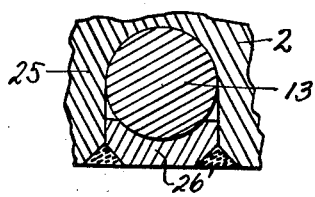
Fig. 4 is a fragmentary cross-section taken along the line 4—4 of Fig. 3.

In its assembled position, the bit, as shown in Figs. 1 and 3, consists of the side roller cutters 20' mounted on axes downwardly and inwardly inclined with respect to the axis of the bit head, and cross roller cutters 21 mounted on the shaft 13 by the roller bearings 22 and ball thrust bearings 23, operating in their respective races as previously described. The threaded ends of the shaft 13 are securely welded to the legs 11, 12, and these legs are welded to the head 10. A bridge 24, whose specific structure will be hereinafter described, is utilized to keep the roller cutters separated and in position, and to serve as a support for the inner ends of the side cutter shafts and the central portion of the cross cutter shaft.

The assembling of the device is performed as follows: First the shaft 13 is screwed into the leg 11. Then the roller bearings 14, 14a, 22 and the thrust bearings 23 are placed, in heavy grease to hold them in position, in their respective races on the side of the shaft toward the leg 11. A roller cutter is then slipped on, and it fits into place with its race 18 engaging the balls 23. Then the smaller roller bearings 14, 14a are fitted into place on the other side of the shaft, and the other roller cutter is slipped on, beyond its normal position, so that the aperture 20 is opposite the ball race 15. Ball bearings are then inserted through the aperture 20 until the race 15 is full. While the cutter is in this position its larger roller bearings 22 are inserted and then the cutter is moved toward its end of the shaft, until its race 18 engages the ball bearings. This moves aperture 20 out of the way, to leave a smooth, uninterrupted race. The bridge 24 is then inserted to space the two cutters, and the other leg 12 is screwed on. Both legs are welded to the bit head 10 and the shaft 13 is welded to the legs at its threaded portions, to produce rigidity. The aperture 20 may be welded closed to prevent the entry of dirt to the bearings.

Figure 2:
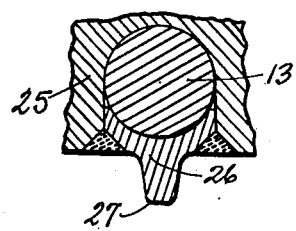
Fig. 2 is a fragmentary cross-section taken along the line 2—2 of Fig. 1.

The bridge 24 extends between the adjacent ends of the side cutter shafts and is formed with a notched portion 25 which fits over the shaft 13. A segment 26 or 26' is welded into place in the bottom of the notch, and in the form shown in Fig. 2, this segment 26 has a nose 27 which acts on the center of the hole to prevent the formation of a core.

It will be seen that by our structure and method of assembling the same we produce a smooth-operating, compact and rigid bit having cross roller cutters. We do not wish to be limited to the specific embodiments of the invention set out herein, but only by the scope of the appended claims.

We claim:

1. In a cross roller bit, a body, depending legs on said body, a continuous shaft mounted between said legs, cross roller cutters on the shaft, thrust ball bearings between each of said cutters and said shaft, said thrust bearings being oppositely disposed to each other to take outward thrust from said cutters, and uninterrupted inwardly facing raceways for said bearings on said continuous shaft.

2. In a cross roller bit, a body, depending legs on said body, a continuous shaft mounted between said legs and having ball and roller bearing raceways, cross roller cutters on the shaft, roller bearings for taking the radial load on said cutters and thrust ball bearings between the shaft and said cutters to take outward thrust from said cutters, said thrust bearings being oppositely disposed to each other, and uninterrupted raceways for said thrust bearings.

3. In a cross roller bit, a body, depending legs on said body, a continuous shaft mounted between said legs, cross roller cutters upon said shaft, a bridge extending between said cutters and spacing them from each other, ball thrust bearings between each cutter and said shaft, said bearings being oppositely disposed to take outward thrust from said cutters and uninterrupted inwardly facing raceways for said bearings on said continuous shaft.

4. In a cross roller bit, a body, depending legs on said body, a continuous shaft mounted between said legs and having ball and roller bearing raceways, two roller cutters upon said shaft, radial roller bearings and ball thrust bearings between each of said cutters and said shaft, said ball thrust bearings being oppositely disposed to take outward thrust from said cutters, and a bridge extending between said cutters and spacing them from each other, said ball thrust bearings having uninterrupted raceways.

5. In a cross roller bit, a body, depending legs on said body, a continuous shaft mounted between said legs, two roller cutters on said shaft, radial bearings and ball thrust bearings between each of said cutters and said shaft, a bridge extending between said cutters and spacing them from each other, said thrust bearings being oppositely disposed to take outward thrust from said cutters and having uninterrupted raceways, and a forwardly extending bit on said bridge adapted to cut the center of a bore hole and prevent the formation of a core in the operation of said bit.

6. In a cross roller bit, a body, depending legs on said body, a continuous shaft mounted between said legs, two cross roller cutters mounted on said shaft, thrust ball bearings between each of said cutters and said shaft, said bearings being outwardly disposed with respect to each other to take outward thrust from said cutters and having uninterrupted raceways, one of said cutters having an aperture of a size to receive the ball thrust bearings, said aperture being located adjacent to but offset from the raceways for said ball thrust bearings in said cutter.

7. In a roller bit assembly, a bit head, two depending legs, a shaft between said legs, said shaft having two roller bearing races at its ends, two thrust ball bearing races adjacent thereto, two central roller bearing races adjacent the ball races, a first roller cutter mounted thereon having an enlarged bore toward the end of the shaft, a smaller bore toward the center of the shaft, a thrust ball race between the two, large roller bearings in the enlarged bore, balls in the ball race, smaller roller bearings in the small bore, a spacing bridge, a roller cutter having a small bore adjacent the bridge, small rollers in this bore, a ball race, ball bearings in the race, a large bore toward the end of the shaft, large roller bearings in the bore, said last-mentioned cutter having a hole through its side spaced from the ball race a distance of less than the spacing bridge and of a size to receive ball bearings, and a cutting nose on said spacing means.

WILLIAM L. CHILDS.
JOHN F. SHAW.
WILEY B. NOBLE.